United States Patent
Fukui

(10) Patent No.: US 8,169,902 B2
(45) Date of Patent: May 1, 2012

(54) WIRELESS TRANSMITTER DEVICE AND METHOD THEREOF FOR KEEPING THE TOTAL TRANSMISSION TIME LIMITED

(75) Inventor: Kiyoshi Fukui, Mie (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 502 days.

(21) Appl. No.: 12/320,876

(22) Filed: Feb. 6, 2009

(65) Prior Publication Data

US 2009/0201906 A1 Aug. 13, 2009

(30) Foreign Application Priority Data

Feb. 8, 2008 (JP) ................................ 2008-029406

(51) Int. Cl.
*G01R 31/08* (2006.01)
(52) U.S. Cl. ............. 370/230.1; 370/231; 370/232; 370/235; 370/253; 370/318; 370/345; 455/522; 455/13.4
(58) Field of Classification Search .................. 370/318, 370/229–235, 253, 345; 455/522, 13.4, 572–574, 455/127.5
See application file for complete search history.

(56) References Cited

U.S. PATENT DOCUMENTS

| | | | |
|---|---|---|---|
| 7,715,320 B2 * | 5/2010 | Huh | 370/235 |
| 7,895,478 B2 * | 2/2011 | Karner et al. | 714/55 |
| 7,948,880 B2 * | 5/2011 | Kwan et al. | 370/230 |
| 2006/0239333 A1 | 10/2006 | Albert et al. | |
| 2007/0046436 A1 * | 3/2007 | Tanaka | 340/10.2 |
| 2007/0066311 A1 | 3/2007 | Reibel et al. | |

FOREIGN PATENT DOCUMENTS

EP 1843528 A1 10/2007

OTHER PUBLICATIONS

Telecom Engineering Center, "Technical Standards for Specific Facilities", retrieved on Dec. 28, 2007, on the website, http://www.telec.or.jp/tech/05_equipment/t243_01.html, p. 1 of specification.
Devrim, Aksin et al., "High-Efficiency Power Amplifier for Wireless Sensor Networks", IEEE, 0-7803-8834-8/05, 2005, pp. 5898-5901.

* cited by examiner

*Primary Examiner* — Christopher Grey
(74) *Attorney, Agent, or Firm* — Rabin & Berdo, P.C.

(57) ABSTRACT

A wireless transmitter device has a predetermined upper limit of an accumulated data transmission time per predetermined duration corresponding to a predetermined maximum value. The wireless transmitter device includes a timer which starts keeping time when the wireless transmitter device sends a wireless signal and stops when it reaches a timeout value, a total transmission measurer for measuring the data transmission time of the wireless transmitter device during a period from the timer starting to stopping, and a transmission controller for refraining the data transmission at the earliest until the time being measured by the timer reaches the timeout value if the accumulation time is, or likely to be, equal to or larger than a threshold value.

7 Claims, 2 Drawing Sheets

WIRELESS TRANSMITTER DEVICE AND METHOD THEREOF FOR KEEPING THE TOTAL TRANSMISSION TIME LIMITED

BACKGROUND OF THE INVENTION

1. Field of the Invention

The present invention relates to a wireless transmitter device, and more particularly to a wireless transmitter device applicable for example to a wireless communication system in which the accumulated time of data transmission per predetermined duration is limited. The present invention also related to a method of wireless transmission for use in such a wireless communication system.

2. Description of the Background Art

Some types of wireless communication devices limit a period of time for their data transmission. For example, with specified low-power radio stations for use in international transportation data transmission, the total transmission period of time is so regulated that the accumulated transmission period of time per hour, i.e. "total transmission time", must fall within the range of 360 seconds according to the rules for international transportation data transmission specified low-power radio station defined by the Telecom Engineering Center, "Technical Standards for Specific Facilities", retrieved on Dec. 28, 2007, on the website, http://www-.telec.or.jp/tech/05_equipment/t243_01.html.

Methods that satisfy the above rule include those which follow. The first method is to specify a transmission pause time so that the transmission time per hour is to be 360 seconds or less. For example, after a one-second transmission is completed, transmission must be paused for nine seconds or more so that the transmission time per hour can be shorter than 360 seconds.

In the second method, the total transmission time per predetermined period of time is measured, and the ratio of total transmission time, or "transmission time ratio", is controlled so as not to be larger than the value of (360 seconds)/(1 hour=3600 seconds)=0.1. When the transmission time ratio almost exceeds the value of 0.1, further transmission is inhibited until the predetermined period of time elapses in order to avoid the transmission time ratio in excess of 0.1. For example, in the case that the predetermined period of time is 60 seconds, the total transmission time is close to exceeding six seconds during the period of 60 seconds, the transmission is inhibited until the period of 60 seconds elapses.

The above-described first and second methods however have the following problems. The first method fails to send data continuously. For example, if a packet is lost, then retransmission of the packet can only start when the pause time elapses after the loss of the packet is detected, which causes a delay before the retransmission.

In the second method described above, the timer must always operate even when no data traffic exists. This increases the power consumption. Especially, when the method is applied to a sensor network in which the communication device is driven by a battery, the timer always causes a problem of power consumption.

SUMMARY OF THE INVENTION

It is therefore an object of the present invention to provide a wireless transmitter device which has its total transmission time per predetermined duration specified to an upper limit and enables a signal transmission with minimized delay and reduced in power consumption even for continuously transmitting wireless signals. It is also an object of the invention to provide a method of wireless transmission for such a wireless transmitter device.

A wireless transmitter device according to the present invention is capable of setting an upper limit of accumulated data transmission time per predetermined duration as a predetermined maximum accumulation time. The wireless transmitter device comprises a first timer for keeping time until a timeout value, which starts when the wireless transmitter device sends a wireless signal during the first timer is idle and stops when the first timer reaches the timeout value, a second timer for measuring an accumulation time of the data transmission of the wireless transmitter device during a period from the first timer starting to the first timer stopping, and a controller for inhibiting the data transmission of the wireless transmitter device at the earliest until the first timer reaches the timeout value either if it is determined that the accumulation time or a value based on the accumulation time is substantially equal to or larger than a threshold value, or if it is determined that the sum of the accumulation time and a time required to send other data or a value based on the sum is substantially equal to or larger than a threshold value.

A wireless transmission program according to the present invention is executable on a computer installed in a wireless transmitter device having an upper limit of an accumulation time for data transmission within a predetermined duration. The program controls the computer to function as a first timer for keeping time until a timeout value, which starts when the wireless transmitter device sends a wireless signal during the first timer is idle and stops when the first timer reaches the timeout value, a second timer for measuring an accumulation time of the data transmission of the wireless transmitter device during a period from the first timer starting to the first timer stopping, and a controller for inhibiting the data transmission of the wireless transmitter device at the earliest until the first timer reaches the timeout value either if it is determined that the accumulation time or a value based on the accumulation time is substantially equal to or larger than a threshold value, or if it is determined that the sum of the accumulation time and a time required to send other data or a value based on the sum is substantially equal to or larger than a threshold value.

A method of wireless transmission according to the present invention in a wireless transmitter device, which has an upper limit of an accumulation time for data transmission within a predetermined duration, and comprises a first timer, a second timer and a controller, includes the steps of keeping time until a timeout value by the first timer which starts when the wireless transmitter device sends a wireless signal during the first timer is idle and stops when the first timer reaches the timeout value, measuring an accumulation time of the data transmission of the wireless transmitter device by the second timer during a period from the first timer starting to the first timer stopping, and inhibiting the data transmission of the wireless transmitter device by the controller at the earliest until the first timer reaches the timeout value either if it is determined that the accumulation time or a value based on the accumulation time is substantially equal to or larger than a threshold value, or if it is determined that the sum of the accumulation time and a time required to send other data or a value based on the sum is substantially equal to or larger than a threshold value.

According to the present invention, a wireless transmitter device for which the upper limit of the total transmission time per predetermined duration is specified can continuously send a wireless signal without delay, thus reducing power consumption.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Now, a preferred embodiment of a wireless transmitter device according to the present invention will be described in detail with reference to the accompanying drawings. For the purpose of making the present invention understood clearer, the description will be concentrated on a simplified case where one wireless transmitter device tries to transmit data to a wireless receiver.

Figure 1:
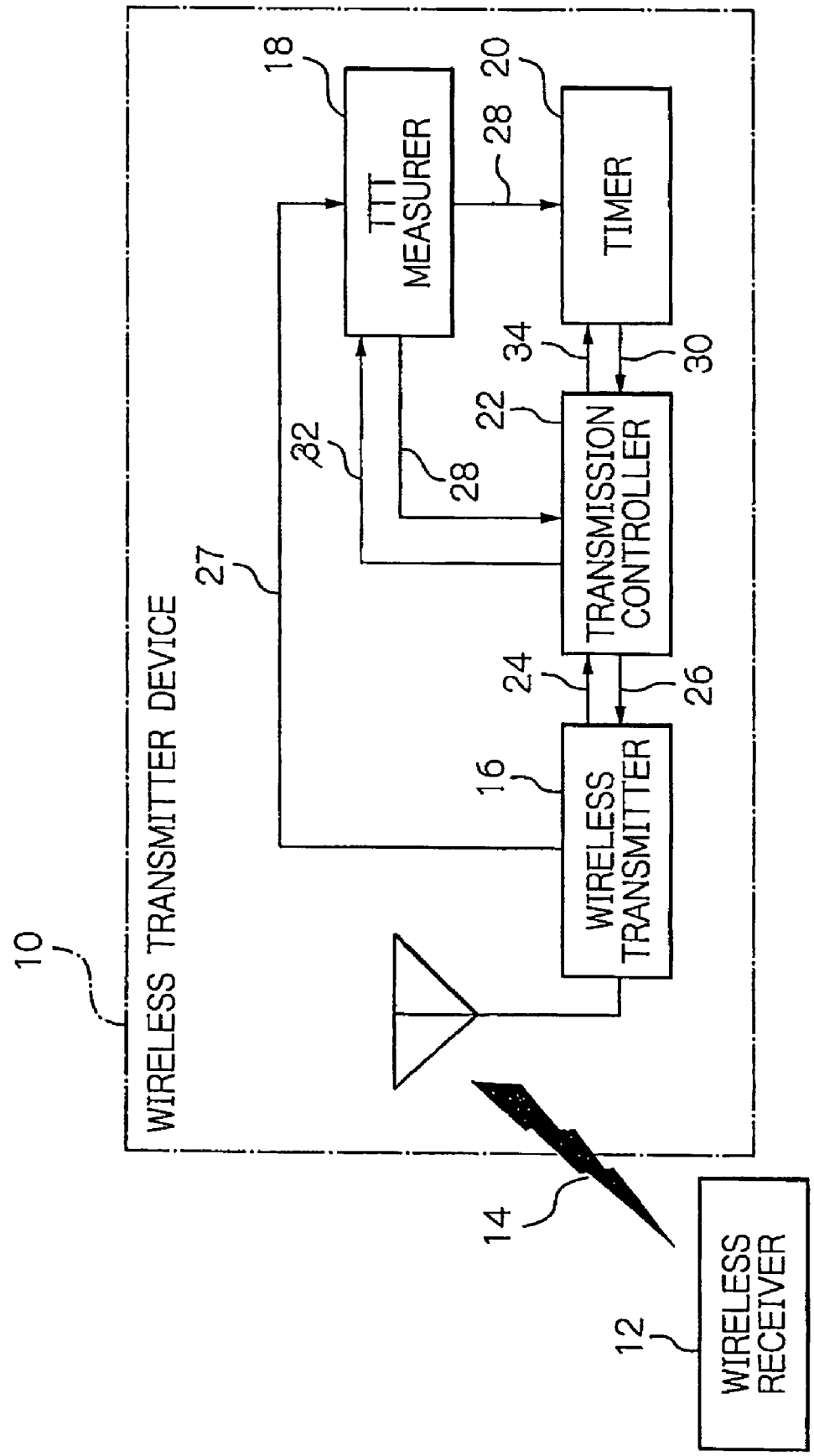
FIG. 1 is a schematic block diagram illustrating the overall structure of a wireless communication system according to an illustrative embodiment of the present invention.

Reference is first made to FIG. 1, which is a schematic block diagram illustrating a specific overall structure of the wireless communication system 1. As seen from the figure, the wireless communication system 1 comprises a wireless transmitter device 10 and a wireless receiver 12.

In the wireless communication system 1, the wireless transmitter device 10 sends data 14 wirelessly, e.g. on radiowave, and the wireless receiver 12 receives it. The wireless transmitter device 10 is controlled in such a way that the total transmission time of data sent per predetermined time, or "T_interval", is shorter than a predetermined maximum total transmission time, or "T_maxsend". In the present embodiment, the wireless transmitter device 10 is controlled to conform to the above-stated rules, and therefore the T_interval is set to one hour (3600 seconds) and the T_maxsend to 360 seconds. Of course, the T_interval and T_maxsend may be set to any appropriate value. In the system shown in FIG. 1, the wireless communication system 1 consists of one wireless transmitter device 10 and one wireless receiver 12. However the communication system 1 may include multiple transmitter devices and receivers.

The wireless transmitter device 10 according to the present embodiment comprisesr as shown in FIG. 1, a wireless transmitter 16, a total transmission time measurer 18, a timer 20 and a transmission controller 22. The wireless transmitter device 10 may include the configuration for executing computer programs, which comprises a CPU (Central Processing Unit), a ROM (Read Only Memory), a RAM (Random Access Memory), an EEPROM (Electrically Erasable and Programmable Read Only Memory), and a hard disk, and an interface for wireless communication. In this case, the wireless transmitter device 10 can attain the above functions by installing and executing a wireless transmission program or the like. Needless to say, the wireless transmitter device 10 may not be implemented by a single unit but by several units attaining the functions by the distributed processing.

The wireless transmitter 16 is adapted for transmitting data 14 to other wireless communication devices, i.e. the wireless receiver 12 in the case of the illustrative embodiment, under the control of the transmission controller 22. Before transmitting the data 14 to the wireless receiver 12, the wireless transmitter 16 sends a send request signal 24 to the transmission controller 22. Then, if the wireless transmitter 16 receives in turn a send-available signal 26 from the transmission controller 22, then it transmits the data 14 to the wireless receiver 12. If the transmitter 16 receives a send-unavailable signal 26, it cancels the data transmission. In the description, signals are thus designated with reference numerals of connections on which they are conveyed.

The total transmission time (TTT) measurer 18 is adapted for measuring the accumulation period of time in which data are transmitted from the wireless transmitter 16 to other wireless communication devices. In the present embodiment, the TTT measurer 18 measures cumulatively the period of time based on information 27 from the wireless transmitter 16 on an actual transmission time consumed in sending each piece of data. The TTT measurer 18 starts and stops measuring the accumulation time and resets the measured time value 28 under the control of the transmission controller 22.

The timer 20 is adapted to start and stop itself, i.e. time keeping or measurement, and resets the measured time value 30 under the control of the transmission controller 22. When the measured time value 30 reaches a timeout value derived by dividing the time value 28 by a predetermined transmission time ratio, i.e. "R_send", the timer 20 notifies the transmission controller 22 of its timeout. The R_send will be detailed later.

The transmission controller 22 is adapted for controlling those structural sections of the wireless transmitter device 10. The transmission controller 22 sends control signals 32 and 34 to the TTT measurer 18 and the timer 20, respectively, to control them, and receives information on the measured time values 28 and 30. When having received the data send request signal 24 from the wireless transmitter 16, the transmission controller 22 determines whether or not the requested data should be sent based on the measured time values 28 and 30 of the TTT measurer 18 and the timer 20, respectively, and returns the determining result 26 to the wireless transmitter 16.

In the present embodiment, when the transmission controller 22 receives the data send request signal 24 from the wireless transmitter 16, it permits the wireless transmitter 16 to send the requested data, and thereafter determines whether or not other data can be send by the wireless transmitter 16 following the required and transmitted data.

In order to obtain a result from the determination which is available even when the next data has its length maximum for transmission by the wireless transmitter device, the transmission controller 22 makes a determination in such a manner that (i) the sum of a currently measured time of the TTT measurer 18 and a time required to transmit data with its length corresponding to the maximum transmittable length is divided by a transmission time ratio, R_send, and then (ii) when the obtained value is smaller than the predetermined maximum value of the timer 20, "T_maxtimeout", the transmission controller 22 determines it "transmittable", and otherwise, i.e. if larger, then "not transmittable".

After the transmission controller 22 determines the next data cannot be sent, it returns a send-unavailable signal 26 to the transmitter 16, at the earliest, until the measured time of the timer 20 reaches the timeout value to inhibit data transmission from the transmitter device 10 to the receiver 12, even when the wireless transmitter 16 issues a data send request.

In this way, in the period of time commencing from the timer 20 starting time keeping or measurement until a measured time reaching the timeout value, it is ensured that the transmission time ratio is substantially equal to or smaller than the R_send.

Figure 2:
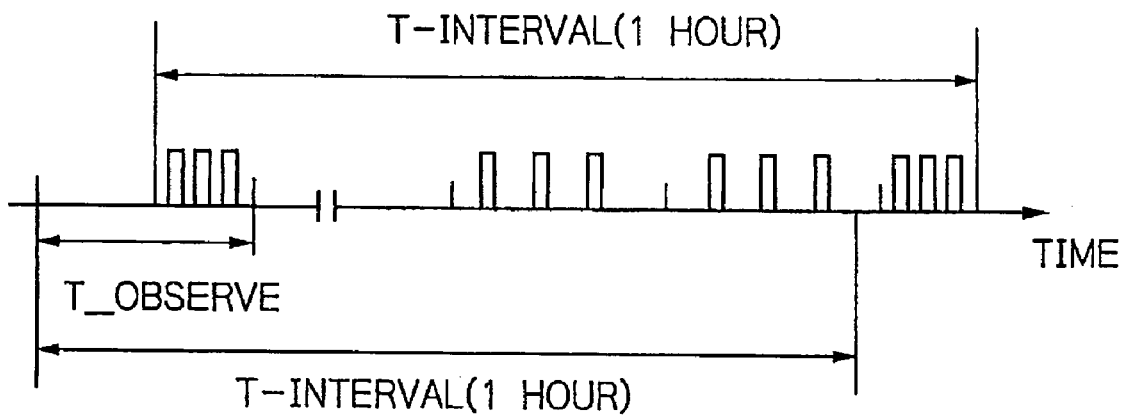
FIG. 2 is a time chart illustrating an example of timing for wireless signal transmission useful for understanding the difference of the total transmission time in the same length periods.

Now, detailed will be the value set as the transmission time ratio, R_send, by the transmission controller 22 with reference to FIG. 2.

FIG. 2 is a time chart illustrating an example of timing for wireless signal transmission for use in understanding that the total transmission time per T_interval may vary depending on the T_intervals when the transmission timing deviates. For example, the upper limit of the total transmission time during the total transmission time measuring period, i.e. "T_observe" [second], could be set to 360×(T_observe/3600) [second] so that the ratio per T_observe is substantially equal to the transmission time ratio per hour, i.e. per T_interval. However, if the transmission timing deviates as shown in FIG. 2, for example, the total transmission time per hour would exceed 360 seconds depending on the T_intervals.

More specifically, if the T_observe could be set to 60 seconds and the total transmission time during the T_observe to six (6) seconds or less, then the total transmission time per hour would be shorter than 360 seconds in the case the transmission timing involves no deviation. However, if the transmission timing deviates as shown in FIG. 2, the total transmission time per hour would be 366 seconds at the maximum depending on the timing of the T_interval.

In order to avoid this problem, in the present embodiment, the upper limit of the total transmission time during the T_observe is defined by the following Expression (1), for example.

$$\text{The upper limit of the total transmission time during the period of } T\_observe \leq T\_maxsend/\{(T\_interval/T\_observe) \text{ with fraction rounded-up}+1\} \quad (1)$$

For example, in the case of T_interval=3600 seconds, T_maxsend=360 seconds and T_observe=60 seconds, the upper limit of the total transmission time during the T_observe, i.e. 60 seconds, obtained from the Expression (1) is equal to 5.9 seconds as seen from the Expression (2) below.

$$\text{The upper limit of the total transmission time during the period of } T\_observe \leq 360/\{(3600/60)+1\} = 360/61 = 5.9 \text{ [second]} \quad (2)$$

Thus, if the transmission timing does not deviate, the total transmission time per T_interval, i.e. per hour, is equal to 354 seconds as seen from the Expression (3) below.

$$5.9 \times (T\_interval/T\_observe) = 5.9 \times (3600/60) \quad (3)$$
$$= 354 \text{[second]}$$

Therefore, when adding to this result the upper limit of the total transmission time (5.9 seconds) during each T_observe as derived from the Expression (2) above, the result is 354+5.9=359.9 seconds. The latter tells that, even when the transmission timing deviates as shown in FIG. 2, it is ensured that the total transmission time during the T_interval (3600 seconds) never exceeds the T_maxsend (360 seconds). Therefore, regardless of whether or not the timing deviates, the total transmission time during the T_interval never exceeds the T_maxsend (360 seconds).

In the case that the wireless transmitter 16 has to maintain its total transmission time per T_interval not exceeding the T_maxsend, the upper limit of the total transmission time during the T_observe may be set to satisfy the Expression (1) above to thereby ensure the total transmission time not to exceed the T_maxsend during any of the T_intervals.

Thus, in order to ensure the maximum total transmission time, T_maxsend, per T_interval, the R-send may be expressed by the following Expression (4), which can be obtained from the Expression (1) using the maximum timeout value T_maxtimeout, since the timeout value is assumed to be the T_observe in the Expression (1).

$$R\_send \leq [T\_maxsend/\{(T\_interval/T\_maxtimeout) \text{ with fraction rounded-up}+1\}]/T\_maxtimeout \quad (4)$$

Under the condition, any total transmission time does not exceed the T_maxsend.

Figure 3:
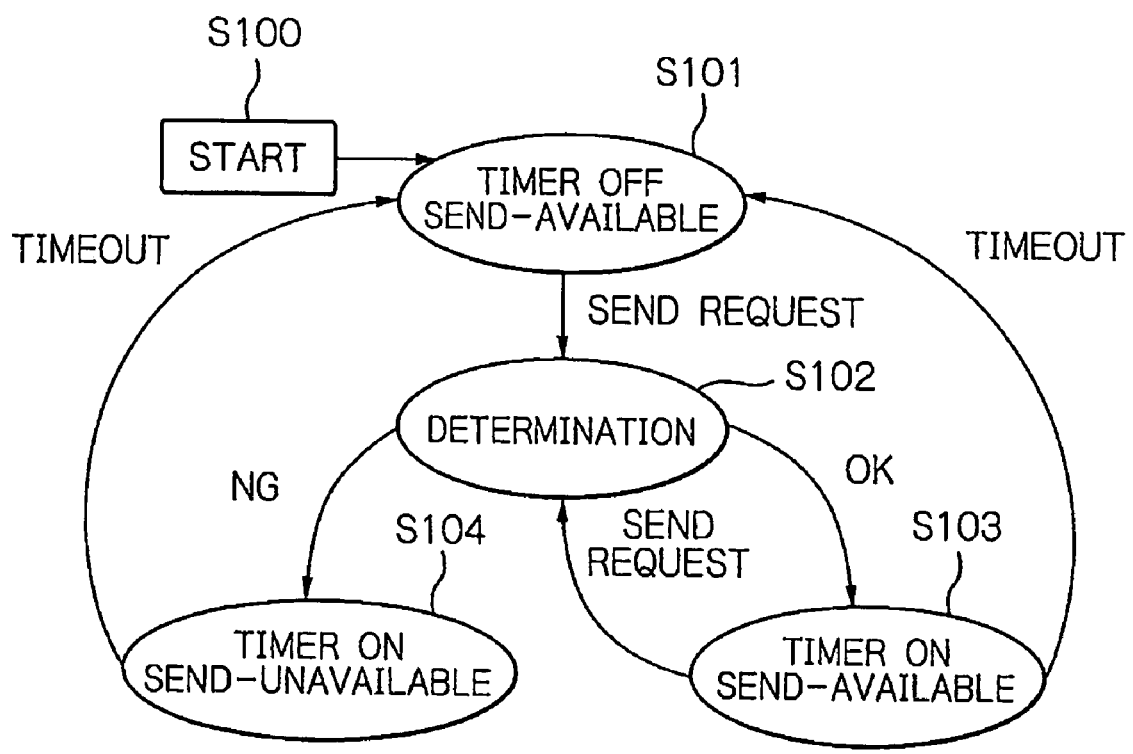
FIG. 3 is a descriptive diagram useful for understanding the state transition of the wireless transmitter device according to the embodiment.

With reference to FIG. 3, a description will be given of the operation of the wireless transmitter device 10 according to the embodiment. FIG. 3 is a state transition diagram useful for understanding the state transition of the wireless transmitter device 10 during its transmission process.

When at first the wireless transmitter device 10 is activated, initialization S100 follows. Then, the timer 20 and the TTT measurer 18 enter their idle or standby states S101 where they are idle (timer OFF) and the transmission controller 22 enters its data transmission available state where it is ready to receive a send request signal and return a send-available signal (send-available).

In the above-described state S101, when the data send request signal 24 is sent from the wireless transmitter 16 to the transmission controller 22, the TTT measurer 18 resets the value retained therein and starts measuring the transmission time. Also the timer 20 resets itself and starts time keeping. Then, the data send-available signal 26 is returned from the transmission controller 22 to the wireless transmitter 16, and the wireless transmitter 16 starts sending the requested data 14. Then, the transmission controller 22 determines whether or not it is possible to send other data after the wireless transmitter 16 completes this data transmission (S102).

In the above-described state S102, if determined send-available, i.e. transmittable (OK), then the timer 20 continue time measuring, i.e. timer ON, and the transmission controller 22 keeps the data transmission available state S103 (send-available).

In the above-described state S103, the wireless transmitter 16 notifies the transmission controller 22 of another data send request, the transmission controller 22 sends a send-available signal 26 and makes determination of the next data transmission availability (S102).

In the above-described state S103, when the time measured by the timer 20 reaches the timeout value, the timer 20 notifies the transmission controller 22 of the timeout, and the TTT measurer 18 and the timer 20 enter their idle state (timer OFF), whereas the transmission controller 22 keeps its send available state (S101).

In the above-described state S102, if determined send-unavailable, i.e. not-transmittable (NG), then the transmission controller 22 enters its intransmittable state S104 (send-unavailable) so as not to send data, whereas the time-measuring by the timer 20 continues (i.e. timer ON). In the send-unavailable state S104, even when a send request is issued from the wireless transmitter 16 to the transmission controller 22, a send-unavailable signal 26 is returned.

In the above-described state S104, when the time measured by the timer 20 reaches the timeout value, the timer 20 notifies the transmission controller 22 of the timeout. Then, the TTT measurer 18 and the timer 20 enter into their idle state S101 (timer OFF).

In the present illustrative embodiment, the wireless transmitter device 10 can control its transmission so that the total transmission time per T_interval does not exceed the maximum total transmission time, T_maxsend, by means of the transmission controller 22, the TTT measurer 18 and the timer 20.

Further, the wireless transmitter device 10 can send data without involving any delay during a period from the timer 20 starts time measuring until the measured time reaches the T_maxtimeout as far as the transmission time ratio is substantially equal to or less than R_send.

Further, the TTT measurer 18 and the timer 20 start time measurement using a send request from the wireless transmitter 16 as a trigger and once stop after the measured time of the timer 20 reaches the timeout value. Then, they restart their time measurement when another send request is received. Thus, the TTT measurer 18 and the timer 20 will not operate while the wireless transmitter device 10 sends no data, thereby reducing the power consumption in the wireless transmitter device 10.

Further, since the transmission controller 22 can control the data transmission in such a way that the time derived by dividing a time measured with the TTT measurer 18 by the R_send is substantially shorter than the T_maxtimeout, and that the R_send is set to satisfy the above-described Expression (4), the total transmission time per T_interval will not exceed the maximum total transmission time, T_maxsend, even when data transmission timing deviates as shown in and described with reference to FIG. 2, for example.

While the present invention has been described with reference to the particular illustrative embodiment, it is not to be restricted by the embodiment. It is to be appreciated that those skilled in the art can change or modify the embodiments without departing from the scope and spirit of the present invention.

For example, for measuring the total transmission time, the TTT measurer 18 of the illustrative embodiment described above measures the time during which the wireless transmitter 16 actually performs transmission. Instead, the total transmission time may be derived by calculating the time required to transmit data to be sent from the wireless transmitter 16 based on the size of the data and accumulating the calculation results.

Further, in the above-described embodiment, the transmission controller 22 is responsive to a send request issued from the wireless transmitter 16 to start transmitting the data, and subsequently determine whether or not the next data are transmittable. Instead, every time the transmission controller 22 receives a data send request from the wireless transmitter 16, it may determine the send availability until it determines not transmittable. In the latter case, the transmission controller 22 may determine the send availability in such a way that it determines not transmittable either (i) only when the total transmission time including the transmission time when the next data requested by the wireless transmitter 16 have been transmitted is calculated and it is determined that a value resultant from dividing the total transmission time by the R_send exceeds the T_maxtimeout, or (ii) only when a value derived by dividing the time measured with the TTT measurer 18 by a predetermined transmission time ratio is larger than the T_maxtimeout.

Further, in the above-described embodiment, the transmission controller 22 applies uniformly to all data the same threshold value, i.e. the maximum timeout value T_maxtimeout, for determining the data send availability in the above-described state S102 shown in FIG. 3. Alternatively, the send availability may be determined by applying different threshold values depending on the priority of data. For example, a lower threshold value may be set for lower priority data, while a higher threshold value may be set for higher priority data. In this way, for example, even when a large amount of low priority data is generated, data with higher priority can preferentially be sent. The priority of each pieces of data may be determined according to the header information of the data.

Furthermore, each pieces of data may have information on the acceptable delay amount in sending data. In this case, if, in the above-described state S102 shown in FIG. 3, the difference between the time measured by the timer 20 and the timeout value is smaller than the acceptable delay amount for the data requested by the wireless transmitter 16, then the transmission controller 22 may refrain from forwarding a response to the send request of the data and wait for the transition to the state S101 after timed out to thence return a send-available signal for the data to the wireless transmitter 16. In this way, when a lot of data with the acceptable delay amount larger are generated, for example, data with the acceptable delay amount smaller, which should be sent earlier, can be preferentially transmitted. The acceptability of delay amount of data may be determined from information carried on the header of the data.

Still further, in the above-described embodiment, the transmission controller 22 controls the data transmission in such way that a value derived by dividing the total transmission time by the R_send will not exceed the T_maxtimeout. Instead, an alternative control way may be applicable in which the total transmission time per se will not exceed a predetermined threshold value. This threshold value may be set so as to satisfy the Expression (5) indicated below, which is resultant from replacing the T_observe in the Expression (1) with the T_maxtimeout.

The threshold value of the total transmission
time≦$T$_maxsend/{($T$_interval/$T$_maxtimeout)
with fraction rounded-up+1} (5)

In addition, in the above-described embodiment, the transmission controller 22 sets the R_send to a value according to the above-described Expression (4). Instead, it may set so that R_send≦T_maxsend/T_interval. For example, if the T_interval is set to 3600 seconds and the T_maxsend is set to 360 seconds, then the R_send may be set to the value of 0.1 or less.

The entire disclosure of Japanese patent application No. 2008-029406 filed on Feb. 8, 2008, including the specification, claims, accompanying drawings and abstract of the disclosure., is incorporated herein by reference in its entirety.

What is claimed is:

1. A wireless transmitter device having an upper limit of an accumulated time for data transmission per predetermined duration corresponding to a predetermined maximum accumulation time, comprising:
a first timer for keeping time until a timeout value, said first timer starting when said device starts sending a wireless signal and stopping when said first timer reaches the timeout value; and
a second timer for measuring an accumulation time of the data transmission of said device during a period from said first timer starting to said first timer stopping,
wherein the timeout value is derived by dividing the accumulation time measured with said second timer by a transmission time ratio based on said predetermined duration and said upper limit of an accumulated time for data transmission per the predetermined duration, and
wherein the device further comprises a controller for inhibiting the data transmission of said device until the time measured by said first timer reaches the timeout value either if it is determined that the timeout value is substantially equal to or larger than a threshold value, or if it is determined that, if said device is requested to send other data, a timeout value which is calculated taking into account time for sending the data is substantially equal to or larger than the threshold value.

2. The device according to claim 1, wherein the transmission ratio is calculated based on at least the maximum accumulation time, and the predetermined duration.

3. The device according to claim 1, wherein said second timer calculates the accumulation time based on an amount of the data sent by said device.

4. The device according to claim 1, wherein the data to be sent from said device includes information on priority, and the threshold value is set depending on the priority.

5. The device according to claim 1, wherein said controller inhibits the data transmission from said device at earliest until the time being measured by said first timer reaches the timeout value if an acceptable delay time set in the data to be transmitted by said device is larger than a difference between the time being measured with said first timer and the timeout value.

6. A non-transitory computer-readable medium that stores a wireless transmission program executable on a computer installed in a wireless transmitter device having an upper limit of an accumulated time for data transmission per predetermined duration, said program controlling the computer to function as:
   a first timer for keeping time until a timeout value, said first timer starting when said device sends a wireless signal and stopping when said first timer reaches the timeout value; and
   a second timer for measuring an accumulation time of the data transmission of said device during a period from said first timer starting to said first timer stopping;
   wherein the timeout value is derived by dividing the accumulation time measured with said second timer by a transmission time ratio based on said predetermined duration and said accumulated time per data transmission per predetermined duration, and
   wherein said program additionally controls the computer to function as a controller for inhibiting the data transmission of said device at earliest until said first timer reaches the timeout value either if it is determined that the accumulation time or a value based on the accumulation time is substantially equal to or larger than a threshold value, or if it is determined that a sum of the accumulation time and a time required to send other data or a value based on the sum is substantially equal to or larger than a threshold value.

7. A method of wireless transmission in a wireless transmitter device having an upper limit of an accumulated time for data transmission per predetermined duration, said wireless transmitter device comprising a first timer, a second timer and a controller, said method comprising steps of:
   keeping time until a timeout value by said first timer which starts, when said wireless transmitter device sends a wireless signal and stops when said first timer reaches the timeout value, said timeout value being derived by dividing the accumulation time measured with said second timer by a transmission time ratio based on said predetermined duration and said upper limit of the accumulated time for data transmission per the predetermined duration;
   measuring an accumulation time of the data transmission of said wireless transmitter device by said second timer during a period from said first timer starting to said first timer stopping; and
   inhibiting the data transmission of said wireless transmitter device by said controller at earliest until said first timer reaches the timeout value either if it is determined that the accumulation time or a value based on the accumulation time is substantially equal to or larger than a threshold value, or if it is determined that a sum of the accumulation time and a time required to send other data or a value based on the sum is substantially equal to or larger than a threshold value.

* * * * *